(12) United States Patent
Marcelo Euripedes

(10) Patent No.: US 10,076,790 B2
(45) Date of Patent: Sep. 18, 2018

(54) ULTRA-PRECISE BORING CARTRIDGE AND ADJUSTMENT DEVICE THEREFOR

(71) Applicant: Kennametal Inc., Latrobe, PA (US)

(72) Inventor: Silva Marcelo Euripedes, Piracicaba (BR)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/219,943

(22) Filed: Jul. 26, 2016

(65) Prior Publication Data
US 2018/0029135 A1 Feb. 1, 2018

(51) Int. Cl.
B23B 29/034 (2006.01)
B23B 29/03 (2006.01)
B25B 13/48 (2006.01)

(52) U.S. Cl.
CPC .......... *B23B 29/0341* (2013.01); *B25B 13/48* (2013.01); *B23B 2260/02* (2013.01); *B23B 2270/36* (2013.01); *Y10T 408/85* (2015.01); *Y10T 408/858* (2015.01)

(58) Field of Classification Search
CPC . Y10T 408/83; Y10T 408/85; Y10T 408/856; Y10T 408/858; Y10T 408/8593; Y10T 408/8583; Y10T 408/85837; Y10T 408/85843; Y10T 408/8585; Y10T 408/8588; Y10T 408/85892; Y10T 408/85895; Y10T 408/858953; Y10T 82/12; Y10T 82/125; B23B 29/02; B23B 29/03; B23B 29/034; B23B 29/03432; B23B 29/03446; B23B 29/0345; B23B 29/03457; B23B 29/0346; B23B 29/03417; B23B 29/03421

See application file for complete search history.

(56) References Cited

U.S. PATENT DOCUMENTS

| | | | | |
|---|---|---|---|---|
| 1,881,523 A | * | 10/1932 | Guldager | .......... B23B 29/03425 408/152 |
| 3,937,587 A | * | 2/1976 | Lindem | ................... B23B 29/02 408/153 |
| 4,786,217 A | | 11/1988 | Johne | |
| 5,222,846 A | | 6/1993 | Romi | |
| 5,316,417 A | | 5/1994 | Romi | |
| 5,326,198 A | | 7/1994 | Romi | |

(Continued)

FOREIGN PATENT DOCUMENTS

JP 2001062613 A * 3/2001

*Primary Examiner* — Nicole N Ramos
(74) *Attorney, Agent, or Firm* — Ian K. Samways

(57) ABSTRACT

An ultra-precise boring cartridge and an adjustment device is disclosed. The boring cartridge includes a cam, a cam follower contacting the cam by a sloped portion, and a spring arrangement exerting a biasing force against the cam follower. The adjustment device includes a graduated dial affixed to an annular sleeve having a hexagonal-shaped end engaged with the boring cartridge. In an embodiment, a dial of the boring cartridge is rotated in increments of about 3.6° by the adjustment device, which causes movement of about 0.005 mm of the cam in a X-direction and movement of about 0.001 mm of the cam follower in a Y-direction, thereby selectively adjusting a machining radius of a cutting insert mounted on the cam follower.

10 Claims, 8 Drawing Sheets

(56) References Cited

U.S. PATENT DOCUMENTS

| | | | |
|---|---|---|---|
| 5,396,693 A * | 3/1995 | Lohner | B23B 29/0341 |
| | | | 29/527.1 |
| 5,735,649 A * | 4/1998 | Boscarino | B23B 29/03428 |
| | | | 407/39 |
| 5,971,675 A | 10/1999 | Romi | |
| 7,699,567 B2 * | 4/2010 | Nedzlek | B23B 27/1688 |
| | | | 408/1 R |
| 8,028,435 B2 | 10/2011 | Basett | |
| 8,881,354 B2 * | 11/2014 | Nakamura | B23B 29/03421 |
| | | | 29/26 R |
| 2013/0071193 A1 | 3/2013 | Kocherovsky et al. | |

* cited by examiner

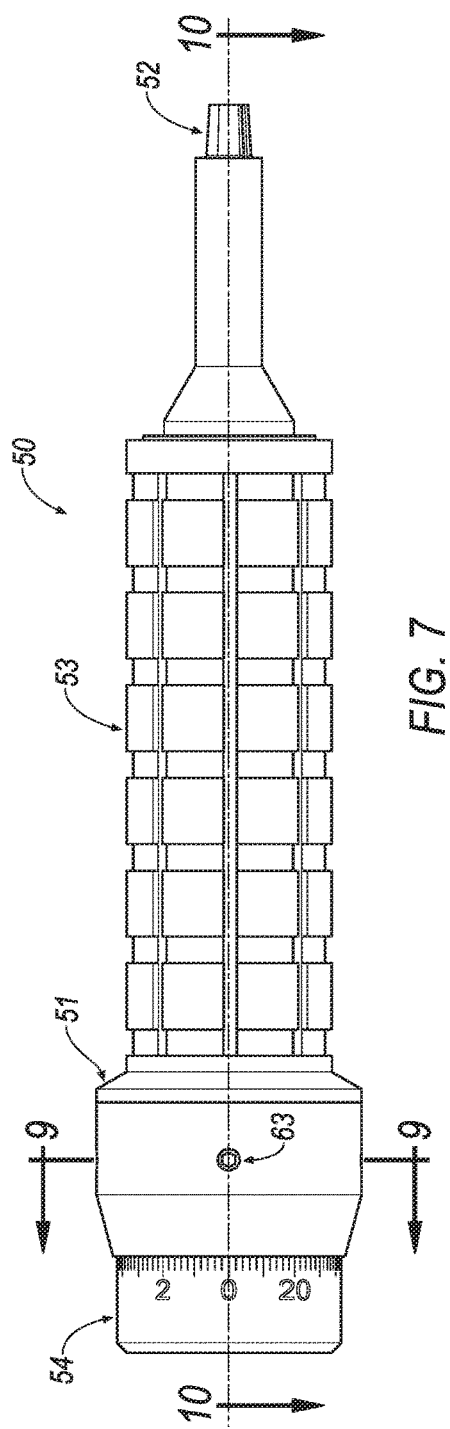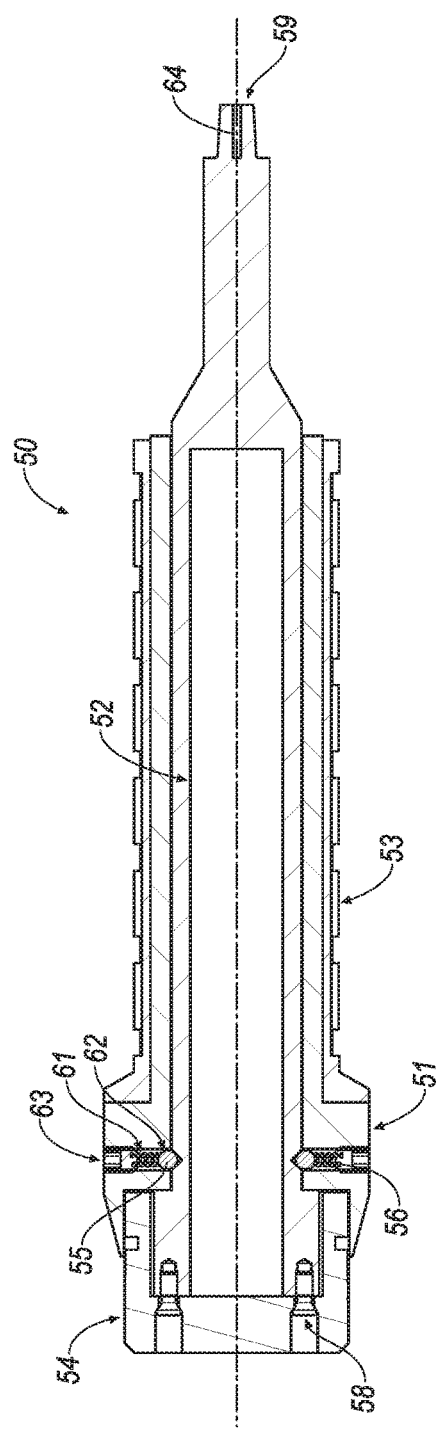

ULTRA-PRECISE BORING CARTRIDGE AND ADJUSTMENT DEVICE THEREFOR

FIELD OF THE INVENTION

The invention pertains, in general, to a boring tool for boring ultra-precise blind and through holes on parts. More particularly, the invention relates to an ultra-precise boring cartridge and an adjustment device to provide adjustment of the cutting edge of a cutting insert to about 0.001 mm (1 µm) on radius.

BACKGROUND OF THE INVENTION

Nowadays, there are several types of precision boring heads, or fine precision boring cartridges in the market. Each one has a mechanism to provide adjustment of the cutting edge. There are different types of mechanisms, as described in, for example U.S. Pat. Nos. 4,786,217, 5,316,417; 5,326,198; 8,028,435 and U.S. Published Application No. 2013/0071193. Each mechanism has their positive and negative aspects, as summarized below.

U.S. Pat. No. 4,786,217 describes a mechanism that is small, uses few parts, and is rigid because it uses elastic deformation to create a spring effect, which keeps parts in contact every time an adjustment is made. The disadvantages of this mechanism are:

(1) The force created by the deflectable part, through elastic deformation is not constant, thus the rigidity can vary along the adjustment range.

(2) Due to its shape, deflectable part can lose elasticity very fast, particularly if the tool works in the limit of the adjustment range for a long time.

(3) Graduations provided to allow reading of the adjustment made are very small, so difficult to see, thus the adjustment is not reliable unless an auxiliary measurement instrument is used, like a comparator.

(4) Adjustment screw can lose engagement with the base body if operator unscrew it more than necessary.

U.S. Pat. Nos. 5,316,417 and 5,326,198 describe a mechanism that is precise and do not require any additional instrument to assure the adjustment made. However, they are complex, use a lot of parts, and because of that, they are more expensive and have a size limit. Besides, the structure of the mechanisms is more likely to present clearance between parts, which causes a difference between the expected and real diameter in the first machined hole.

U.S. Pat. No. 8,028,435 relates to an electronic system to adjust the tool, in order to improve the reliability of the adjustments, by providing a display that shows the machined diameter. This system has the following problems:

(1) The electronic circuitry can fail due to contact with coolant.

(2) Engagement with the body is difficult because operator should assure simultaneous contact with the adjusting screw and electrical contacts.

(3) Needs a battery to work, so it is necessary to stock this item and someone to control the battery life in order to keep the system working.

Finally, U.S. Published Application No. 2013/0071193 describes a small cartridge, which less parts and a stiff mechanism. This mechanism has the follow disadvantages:

(1) The adjustment process changes the lead angle, so applying this mechanism to blind holes is limited.

(2) The resolution is only 0.005 mm (5 µm).

(3) To make the adjustment more reliable, it is necessary to use or a gage, or a device with a light projection device.

Therefore, there is a need to provide a mechanism that solves the negative aspects described above.

SUMMARY OF THE INVENTION

The problem of selectively adjusting a machining radius of a cutting insert with ultra-precision is solved by providing a ultra-precision boring cartridge and an adjustment wrench, wherein movement of 1/100 of a full turn on a dial of the boring cartridge by the adjustment wrench causes movement of about 0.005 mm of a cam in a X-direction and movement of about 0.001 mm of a cam follower in a Y-direction, thereby selectively adjusting a machining radius of a cutting insert mounted on the cam follower.

In one aspect of the invention, an ultra-precision boring cartridge comprises a housing; a dial rotationally mounted within the housing; a cam having a threaded portion, wherein rotation of a dial causes linear movement of the cam; a cam follower contacting the cam by a sloped portion that is inclined at an angle with respect to a plane parallel to an X-axis; and a spring arrangement exerting a biasing force against the cam follower. Rotation of the dial in a clockwise direction causes movement of the cam in a first X-direction and movement of the cam follower in a first Y-direction. Rotation of the dial in a counterclockwise direction causes movement of the cam in a second, opposite X-direction and movement of the cam follower in a second, opposite Y-direction due to the biasing force exerted by the spring arrangement against the cam follower. Movement of the cam follower in the first and second Y-directions selectively adjusts a machining radius of a cutting insert mounted on the cam follower.

In another aspect of the invention, an adjustment wrench causes rotation of the dial of the boring cartridge as described in the above paragraph.

In yet another aspect of the invention, a combination ultra-precision boring cartridge and an adjustment wrench, wherein movement of 1/100 of a full turn on a dial of the boring cartridge by the adjustment wrench causes movement of about 0.005 mm of a cam in a X-direction and movement of about 0.001 mm of a cam follower in a Y-direction, thereby selectively adjusting a machining radius of a cutting insert mounted on the cam follower.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 7 is a side view of an adjustment wrench according to an embodiment of the invention;

FIG. 10 is a cross-sectional view of the adjustment wrench taken along line 10-10 of FIG. 7;

DETAILED DESCRIPTION OF THE INVENTION

Figure 1:
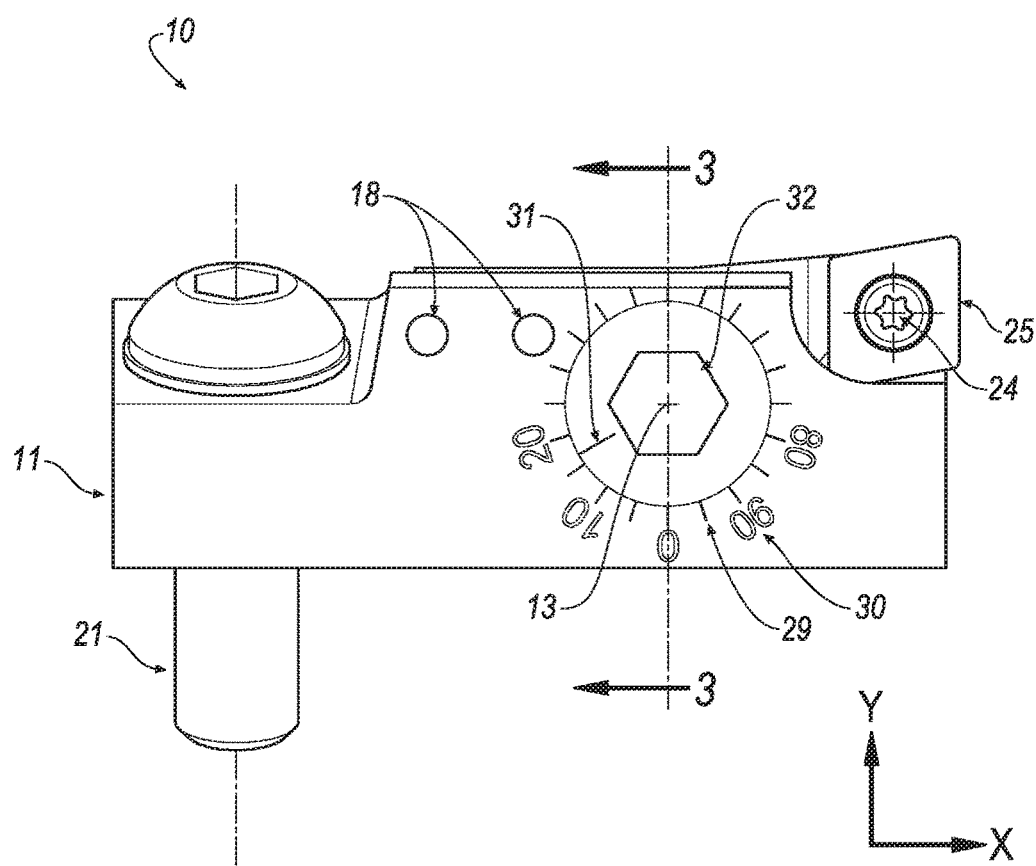
FIG. 1 is a front view of an ultra-precise boring cartridge according to an embodiment of the invention.
Figure 2:
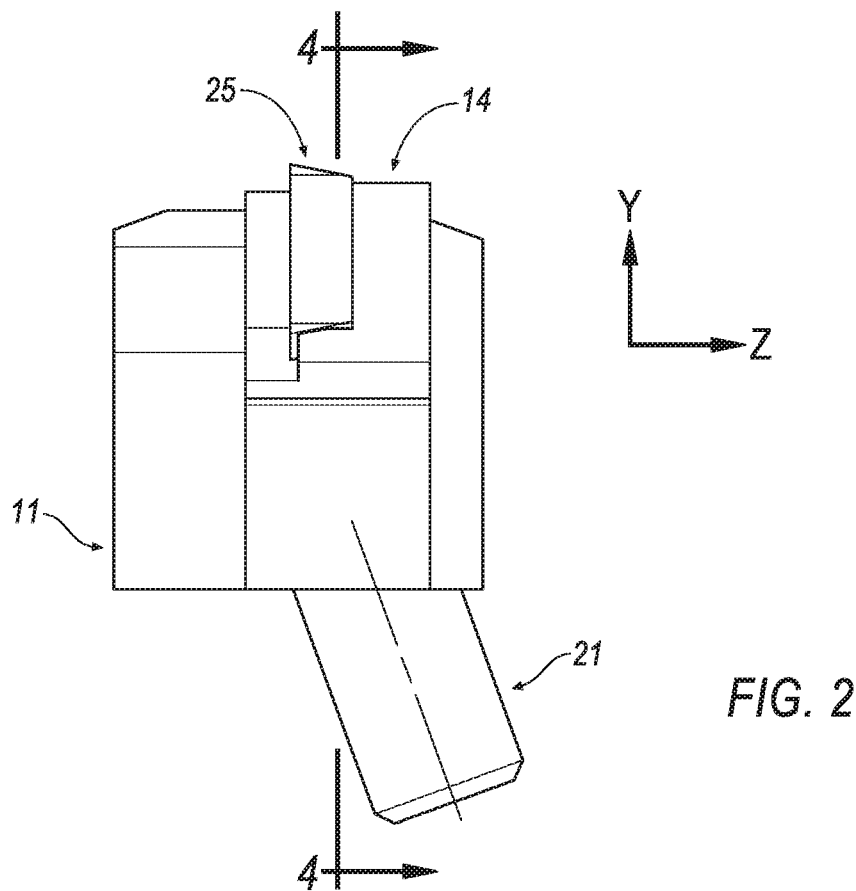
FIG. 2 is a side view of the ultra-precise boring cartridge of FIG. 1.

Referring now to FIGS. 1-6, an ultra-precise boring cartridge 10 is shown according to an embodiment of the invention. In general, the cartridge 10 contains two moving parts: a cam 12 (i.e. driving part) and a cam follower 14 (i.e. driven part). In the illustrated embodiment, the cam 12 comprises a plate cam that provides flat contact between the cam 12 and the cam follower 14. A spring arrangement 17 exerts a biasing force against the cam 12 and the cam follower 14 to maintain constant contact between the cam 12 and the cam follower 14. In the illustrated embodiment, the spring arrangement 17 comprises a pair of Belleville springs arranged in series. A pair of pins 18 apply a preload to the spring arrangement 17. In addition, the pins 18 improve safety by protecting the cam follower 14 against centrifugal forces.

Figure 5:
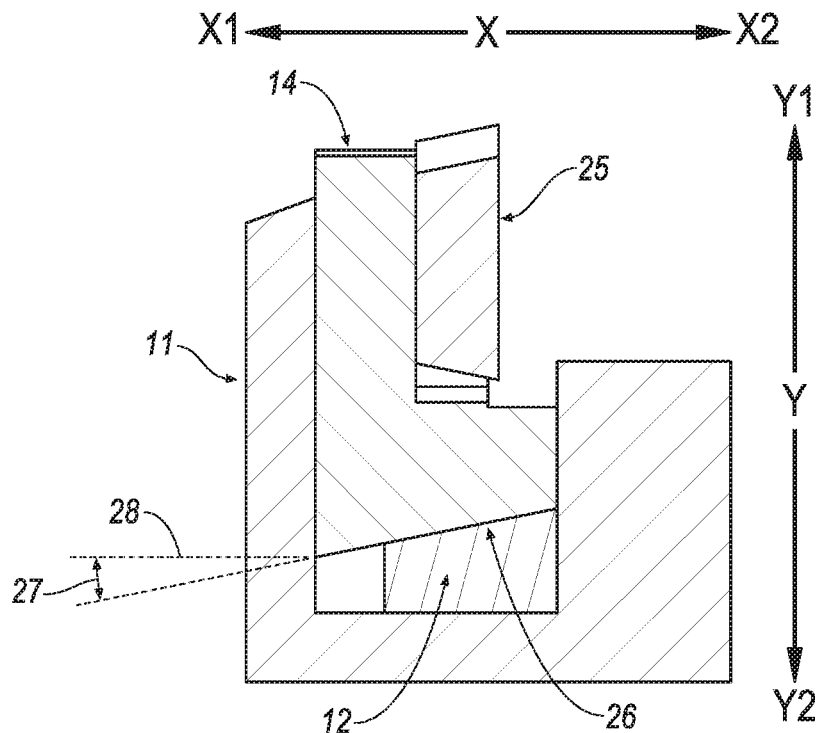
FIG. 5 is a cross-sectional view of the ultra-precise boring cartridge taken along line 5-5 of FIG. 4.
Figure 6:
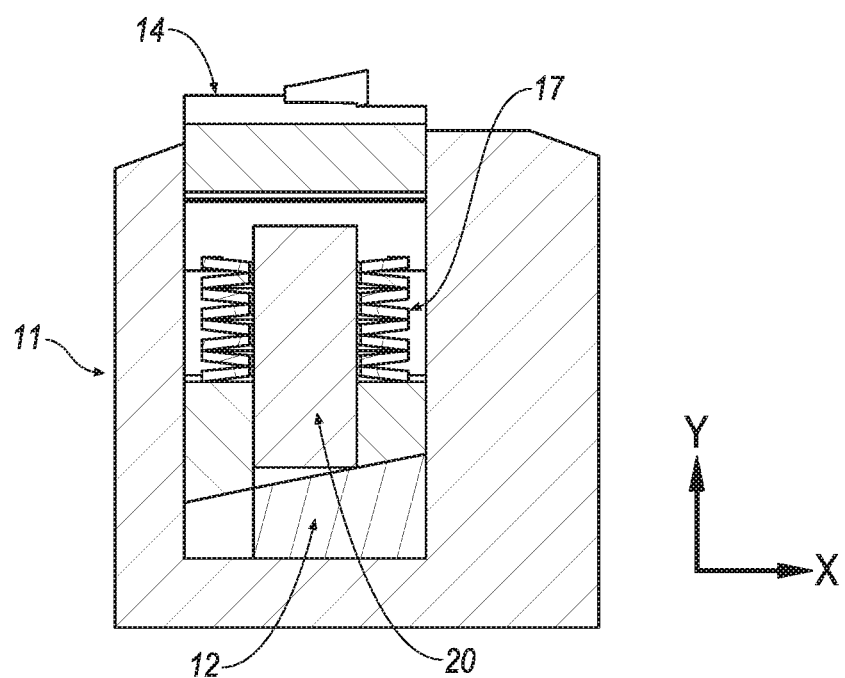
FIG. 6 is a cross-sectional view of the ultra-precise boring cartridge taken along line 6-6 of FIG. 4.
Figure 8:
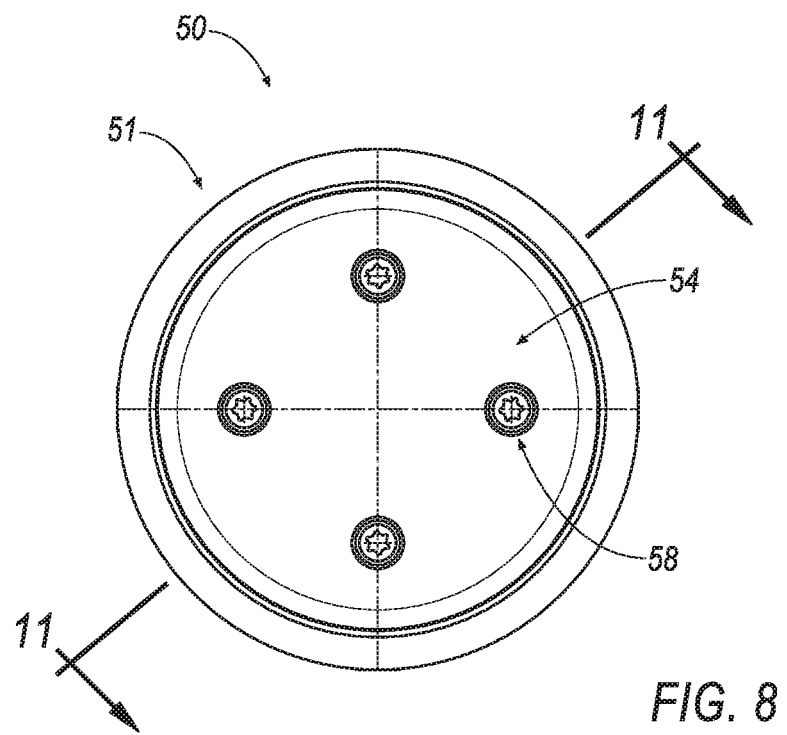
FIG. 8 is an end view of the adjustment wrench of FIG. 7.

When the cam 12 moves in the X1 direction (i.e., along the X-axis), the cam 12 will move the cam follower 14 in the Y1 direction (i.e., along the Y-axis) because both the cam 12 and the cam follower 14 contact each other by a sloped portion 26 that is inclined at an angle 27 with respect to a plane 28 that is parallel to the X-axis, as shown on FIG. 5. In one embodiment, the angle 27 is in the range between about 5° and about 15°. When the cam 12 moves in the X2 direction (i.e., opposite to the X1 direction along the X-axis), the pair of springs 17 will move the cam follower 14 in the direction Y2 (i.e., opposite to the Y1 direction along the Y-axis). As a result of the movement of the cam follower 14 in the Y-direction, a cutting insert 25 attached to the cam follower 14 by a mounting screw 24 will move in Y-direction, thereby causing a change in the machining diameter (or radius) of the boring cartridge 10.

Figure 3:
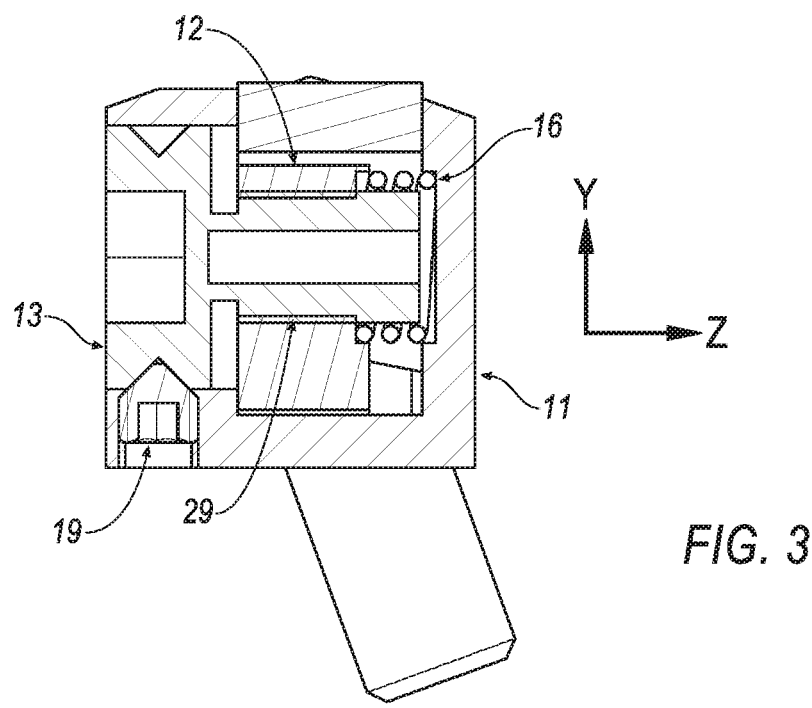
FIG. 3 is a cross-sectional view of the ultra-precise boring cartridge taken along line 3-3 of FIG. 1.

A dial 13 is rotationally mounted within the housing 11. Rotation of the dial 13 causes the linear movement of the cam 12 in the X-direction (i.e. axial direction) because of a threaded portion 29 comprising threads on the dial 13 and threads on the cam 12, as shown in FIG. 3. In one embodiment, the threads on the dial 13 are left handed and have a pitch of about 0.5 mm. It is noted that the dial 13 cannot move in the X-direction because a pair of screws 19 prevent such unwanted movement. When an operator rotates the dial 13 in a clockwise direction (as viewed in FIG. 1), the dial 13 moves the cam 12 in the X1-direction. Oppositely, when the operator rotates the dial 13 is a counterclockwise direction (as viewed in FIG. 1) the dial 13 moves the cam 12 in the X2-direction (opposite from the X1-direction). The movement of the cam 12 in the X-direction is proportional to the pitch of the threads of the threaded portion 29. In one embodiment, for example, one full turn of rotation of the dial 13 corresponds to about 0.5 mm of axial movement of the cam 12, one-half full turn of rotation of the dial 13 corresponds to about 0.25 mm of axial movement of the cam 12, and so on. Because a precise movement between the rotation of the dial 13 and the linear movement of the cam 12 is highly desirable, a biasing member 16, such as a spring, and the like, provides a biasing force against the cam 12 to eliminate any clearance between the cam 12 and the dial 13. In one embodiment, the biasing member 16 comprises a helical spring.

Figure 4A:
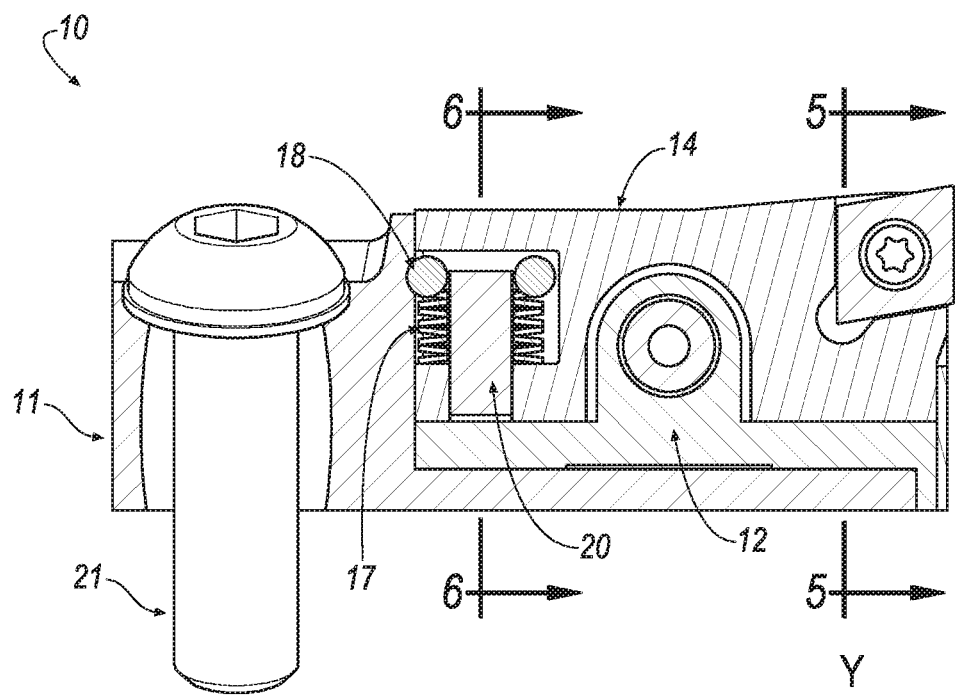
FIG. 4A is a cross-sectional view of the ultra-precise boring cartridge taken along line 4-4 of FIG. 2.

When the cam follower 14 moves in the Y1-direction, the cam follower 14 causes compression of the pair of springs 17. Because the pins 18 remains stationary with respect to the housing 11, the load in the springs 17 will increase, forcing the cam follower 14 to move back to the Y2-direction. During this movement, the springs 17 cannot have axial movement in the X-direction; otherwise, the springs 17 would not be properly loaded. A hold pin 20 is provided to prevent such axial movement of the springs 17 in the X-direction, as shown in FIG. 4A.

Figure 4B:
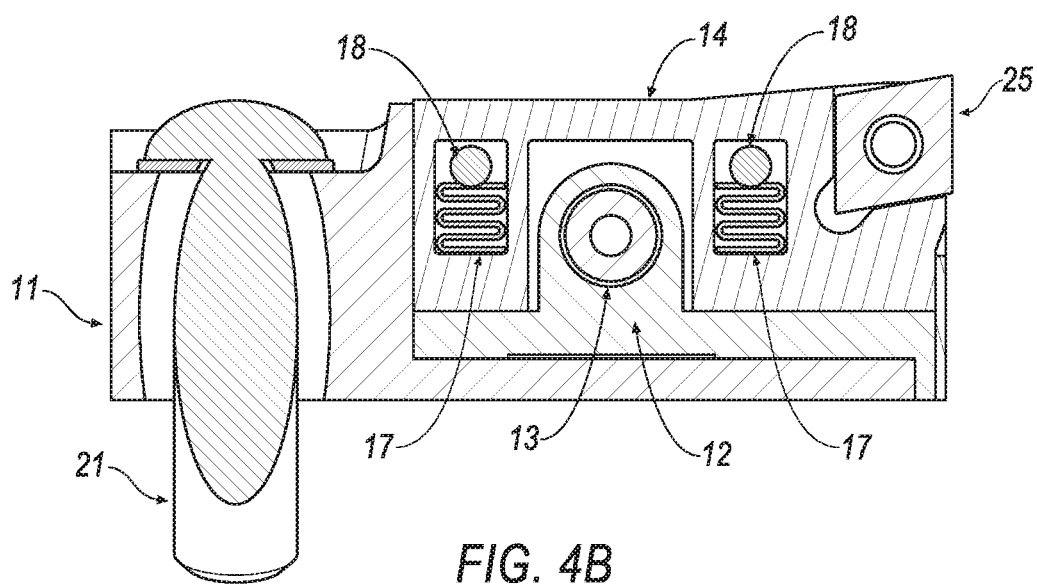
FIG. 4B is a cross-sectional view similar to FIG. 4A for a spring arrangement according to an alternate embodiment of the invention.

FIG. 4B shows an alternate embodiment of the spring arrangement 17 in which one spring 17 is located on one side of the dial 13 and the other spring 17 is located on the opposite side of the dial 13. In this embodiment, the hold pin 20 can be eliminated because the cam follower 14 prevents axial movement of the springs 17 in the X-direction.

When the dial 13 rotates counterclockwise (as viewed in FIG. 1), the cam 12 moves in the X2-direction (opposite to the X1-direction), thereby causing the cam follower 14 to move in the Y2-direction (opposite to the Y1-direction) due to the forces exerted by the springs 17 against the cam follower 14.

Figure 12:
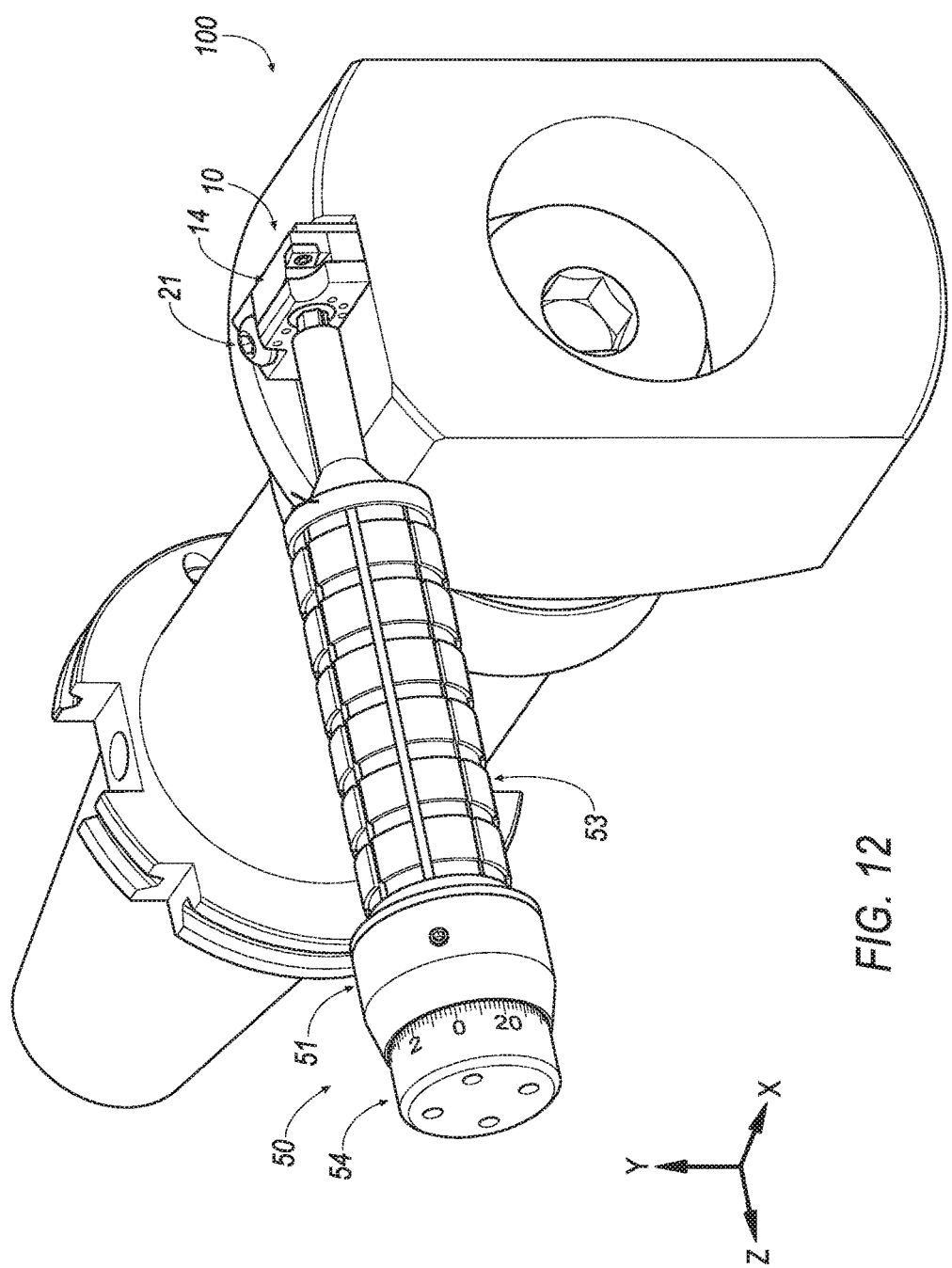
FIG. 12 is a perspective view of the ultra-precise boring cartridge mounted on an adaptor and the adjustment wrench engaging the boring cartridge according to an embodiment of the invention.

Finally, a mounting screw 21 is provided to mount the boring cartridge 10 to any desirable adaptor 100 (FIG. 12).

As mentioned above, the sloped portion 26 between the cam 12 and the cam follower 14 has an angle 27 of about between about 5° and about 15°. In one embodiment, for example, the sloped portion 26 has an angle 27 of about 11.31 degrees. In this embodiment, the movement Δx of the cam 12 in the X-direction causes a Δy/5 movement of the cam follower 14 in the Y-direction, i.e., a movement of about 0.5 mm of the cam 12 in the X-direction will cause a movement of the cam follower 14 of about 0.1 mm in the Y-direction.

As explained above, rotation of the dial 13 causes a proportional linear movement of the cam 12. This linear movement is proportional to the pitch of the threads of the threaded portion 29. According to this proportion, a movement of 1/100 of a full turn (i.e., about) 3.60° on the dial 13 will cause about a 0.005 mm movement of the cam 12 in the X-direction, and movement of the cam follower 14 of about 0.001 mm in the Y-direction. Similarly, if the dial 13 moves 1/20 of a full turn (i.e., about) 18°, the X movement of the cam 12 will be about 0.025 mm, thereby causing the cam follower 14 to move about 0.005 mm in the Y-direction.

However, it is very difficult for an operator to rotate the dial 13 about 18°. To assist the operator of movement of the cam follower 14 of about 0.005 mm, the housing 11 can be engraved with lines 29 that are spaced approximately 18° apart from each other, and numbers 30 to facilitate the reading of the dial 13 in increments of 10°. Furthermore, the dial 13 includes an index 31 to provide an indication of the amount of rotation of the dial 13. As shown in FIG. 1, the index 31 indicates that the dial 13 is rotated to a reading of about 16.

In reality, however, the same logic does not apply to obtain about a 0.001 mm of movement of the cam follower 14 in the Y-direction by engraving lines 29 that are spaced about 3.6° apart because the lines 29 would be illegible to the human eye.

Referring now to FIGS. 7-11, an adjustment device 50 is shown according to an embodiment of the invention that provides rotation of the dial 13 of the boring cartridge 10 in increments of about 3.6° (i.e., a movement of 1/100 of a full turn on the dial 13 and about a 0.005 mm movement of the cam 12 in the X-direction, and movement of the cam follower 14 of about 0.001 mm in the Y-direction).

During operation, the operator can hold the adjustment device 50 by a handle 53 with one hand, and engage the dial 13 of the boring cartridge 10, as shown on FIG. 12. The engagement with the boring cartridge 10 is accomplished by the adjustment device 50 having an annular sleeve 52 with a hexagonal-shaped end 59 that engages a hexagonal-shaped recess 32 on the dial 13 of the boring cartridge 10 (FIG. 1). The required precision of rotation of the dial 13 on the boring cartridge 10 is possible only if there is no clearance in the engagement between the adjustment device 50 and the boring cartridge 10. Therefore, the hexagonal-shaped end 59 on the adjustment device 50 is slightly larger than the hexagonal-shaped recess 32 on the dial 13 of the boring cartridge 10 and has a slot 64 to enable the hexagonal-shaped end 59 to slightly deform and securely hold the hexagonal-shaped end 59 of the adjustment device 50 within the hexagonal-shaped recess 32 of the dial 13.

Figure 11:
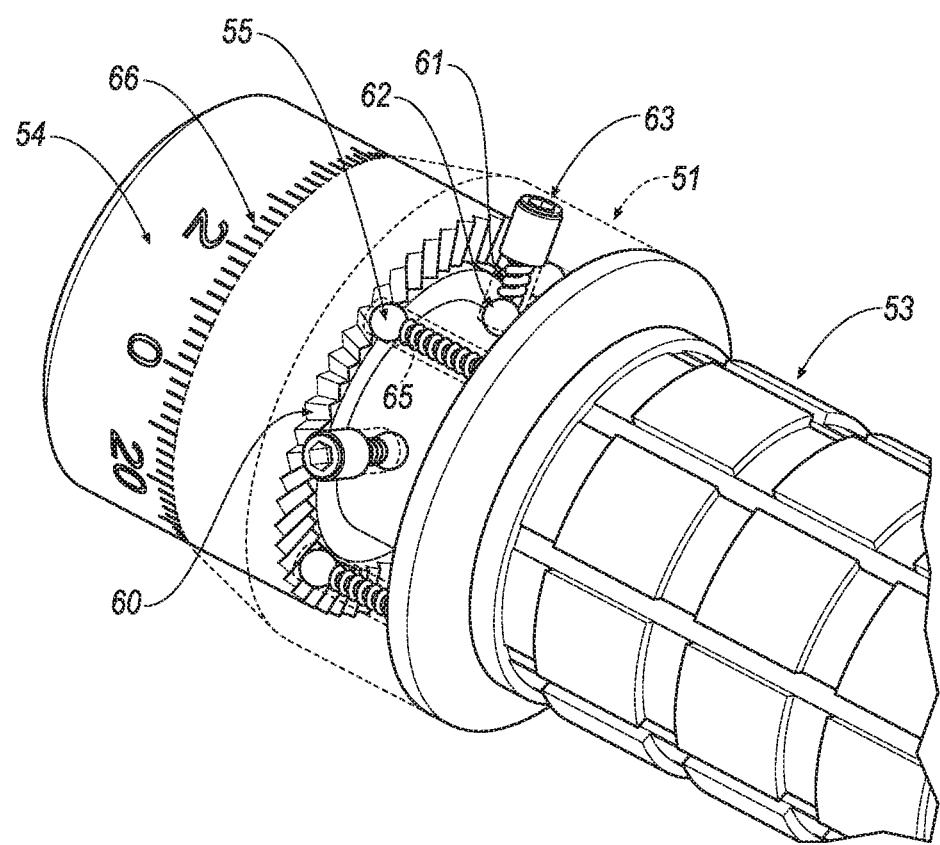
FIG. 11 is an enlarged view of the adjustment wrench showing the internal arrangement comprising a plurality of teeth, a plurality of balls, and a plurality of springs (shown in phantom)

After engaging the adjustment device 50 in the dial 13 of the boring cartridge 10, the operator can rotate a graduated dial 54 of adjustment device 50 with one hand. The rotation of the graduated dial 54 is not continuous; it can only be made in increments of about 3.6°, because the graduated dial 54 has one-hundred teeth 60 that engage with a plurality of balls 55 biased by springs 56. In the illustrated embodiment, the teeth 60 engage four balls 55 spaced about 90° apart from each other, as shown in FIG. 11. The balls 55 and springs 56 are located in holes 65 in the body 51 of the adjustment device 50. Thus, when the graduated dial 54 is rotated, the teeth 60 pushes the balls 55 against the springs 56. When the graduated dial 54 is rotated 3.6° by the operator, the springs 56 push the balls 55 against the teeth in a movement that can be felt by the operator. Also, this movement makes a clicking sound that can be heard by the operator. Additionally, the operator can see the adjustment by looking at the markings 66 engraved on the graduated dial 54.

The graduated dial 54 is affixed to the annular sleeve 52 by screws 58. Thus, the rotational movement of the graduated dial 54 is directly transferred to rotational movement of the annular sleeve and the hexagonal-shaped end 59, which is engaged with the boring cartridge 10. Thus, by rotating the graduated dial 54 of the adjustment device 50 in increments of about 3.6°, the dial 13 of the boring cartridge 10 is also rotated in increments of about 3.6°, thereby accomplishing about 0.001 mm movement of the cutting insert 25 in the Y-direction (i.e., on radius of the cutting insert 25).

Figure 9:
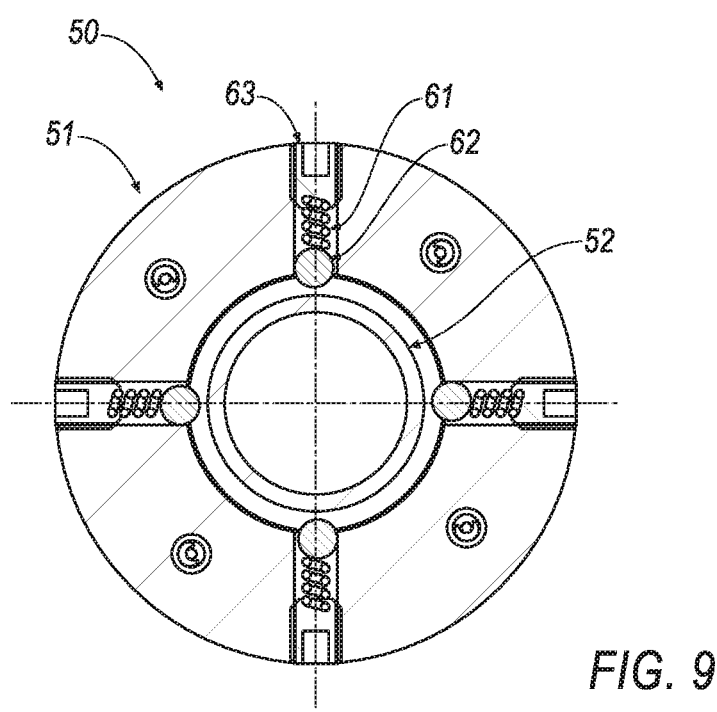
FIG. 9 is a cross-sectional view of the adjustment wrench taken along line 9-9 of FIG. 7.

As shown in FIGS. 9 and 10, the annular sleeve 52 (and the hexagonal-shaped end 59) of the adjustment device 50 is supported by a plurality of springs 61 and a plurality of balls 62. As a result, the annular sleeve 52 is floating in the body 51 such that rotation of the graduated dial 54, the annular sleeve 52 and the hexagonal-shaped end 59 can be easily accomplished. The springs 61 are held in place by a threaded fastener 63, such as a screw, bolt, and the like.

The ultra-precision boring cartridge 10 and adjustment device 50 have several advantages, which are:

(1) By providing the boring cartridge 10 and the adjustment device 50 as separate components, the size of the boring cartridge 10 can be drastically reduced, thereby significantly increasing the number of possible applications of the boring cartridge 10.

(2) By providing the boring cartridge 10 and the adjustment device 50 as separate components, the cost of the boring cartridge 10 is drastically reduced. In addition, the customer needs to buy only one adjustment device 50 for several boring cartridges 10.

(3) By providing the boring cartridge 10 and the adjustment device 50 as separate components, the boring cartridge 10 and the adjustment device 50 are not so sensitive to deviations in geometrical tolerances.

(4) The adjustment of the boring cartridge 10 is completely mechanical, thereby avoiding battery replacement and additional costs associated with the disposal and replacement of the battery.

(5) The two moving parts (i.e., the cam 12 and the cam follower 14) that transform movement in the X direction to movement in the Y-direction are planar inclined surfaces, not cylindrical, thereby increasing the stiffness of the adjustment mechanism.

(6) The boring cartridge 10 provides tension, which also increases the stiffness of the mechanism. It can be designed in a way to keep constant force during the adjustment, which is good to sensibility of the adjustment.

(7) The boring cartridge 10 allows more clearance between the two moving parts (i.e., the cam 12 and the cam follower 14), thereby avoiding tight manufacturing tolerances and reducing the cost of the boring cartridge 10.

(8) The simplicity of the boring cartridge 10 also makes service easier, allowing the boring cartridge 10 to be quick repaired. Also, the cost of the boring cartridge 10 allows the customer to keep a replacement cartridge in stock. Therefore, work does not need to be stopped during repair of a damaged cartridge.

(9) The durability of the adjustment device 50 is very high because it is not subjected to chips hitting its surfaces, and it is not subject to collisions with the boring cartridge 10.

(10) The lead angle is not changed during the adjustment of diameter of the cutting insert 25, so the boring cartridge 10 can be used for the machining of blind holes.

(11) A zero ring can be added to the adjustment device 50 in order to make adjustments easier.

The patents and publications referred to herein are hereby incorporated by reference.

Having described presently preferred embodiments the invention may be otherwise embodied within the scope of the appended claims.

What is claimed is:

1. An ultra-precise boring cartridge, comprising:
   a housing;
   a dial rotationally mounted within the housing;
   a cam having a threaded portion, wherein rotation of the dial causes linear movement of the cam;
   a cam follower contacting the cam by a sloped portion that is inclined at an angle with respect to a plane parallel to an X-axis; and
   a spring arrangement exerting a biasing force against the cam follower,
   wherein rotation of the dial in a clockwise direction causes movement of the cam in a first X-direction and movement of the cam follower in a first Y-direction, and wherein rotation of the dial in a counterclockwise direction causes movement of the cam in a second, opposite X-direction and movement of the cam follower in a second, opposite Y-direction due to the biasing force exerted by the spring arrangement against the cam follower, and wherein movement of the cam follower in the first and second Y-directions selectively adjusts a machining radius of a cutting insert mounted on the cam follower.

2. The boring cartridge according to claim 1, wherein the sloped portion has an angle of between about 5° and about 15° with respect to the plane parallel to the X-axis.

3. The boring cartridge according to claim 1, wherein:
movement of the cam in the first and second X-directions over a first distance causes a movement of the cam follower in the first and second Y-directions, respectively, over a second distance which is smaller than the first distance.

4. The boring cartridge according to claim 3, wherein movement of the cam of about 0.005 mm in the first and second X-directions causes a movement of the cam follower of about 0.001 mm in the first and second Y-directions, respectively.

5. The boring cartridge according to claim 1, further comprising a biasing member for providing a biasing force against the cam to eliminate any clearance between the cam and the dial.

6. The boring cartridge according to claim 1, wherein the spring arrangement comprises a pair of springs separated by a hold pin which prevents movement of the pair of springs in a direction other than the first and second Y-directions.

7. The boring cartridge according to claim 1, wherein the dial includes a hexagonal-shaped recess accommodating a hexagonal-shaped end of an adjustment device.

8. The boring cartridge according to claim 1, comprising:
at least one element which applies a preload to the spring arrangement;
wherein the at least one element is stationary with respect to the housing.

9. The boring cartridge according to claim 3, wherein the second distance is one-fifth of the first distance.

10. The boring cartridge according to claim 6, wherein the hold pin prevents movement of the pair of springs in either of the first and second X-directions.

* * * * *